Oct. 13, 1953     C. L. EKSERGIAN     2,655,228
SELF-ENERGIZING BRAKE
Filed Sept. 2, 1950     3 Sheets-Sheet 1
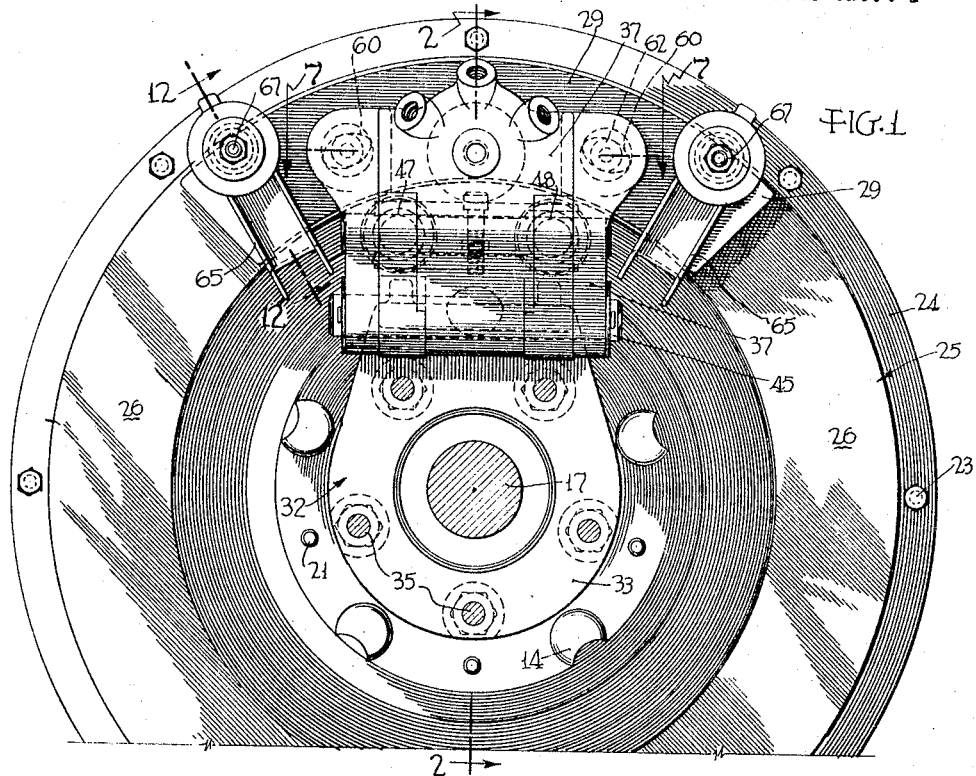
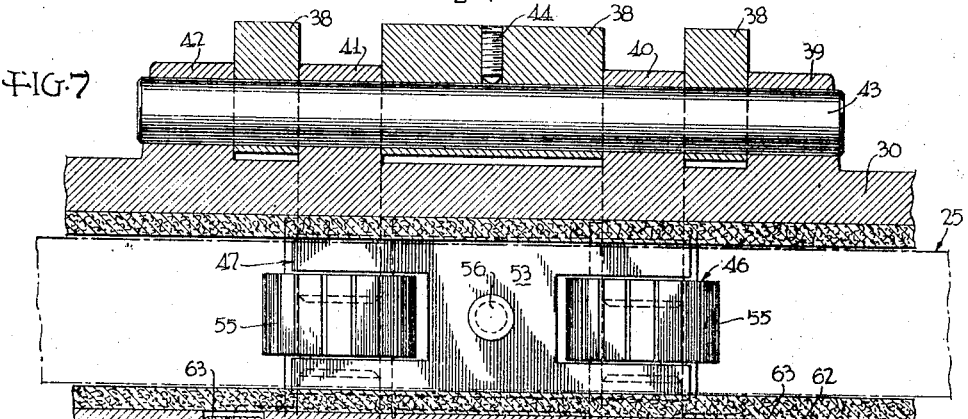
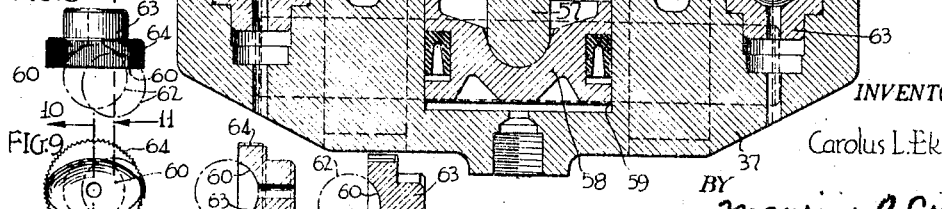
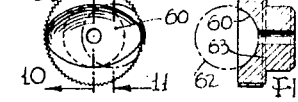
INVENTOR.
Carolus L. Eksergian
BY Maurice A. Crowl
ATTORNEY Oct. 13, 1953   C. L. EKSERGIAN   2,655,228
SELF-ENERGIZING BRAKE
Filed Sept. 2, 1950   3 Sheets-Sheet 3
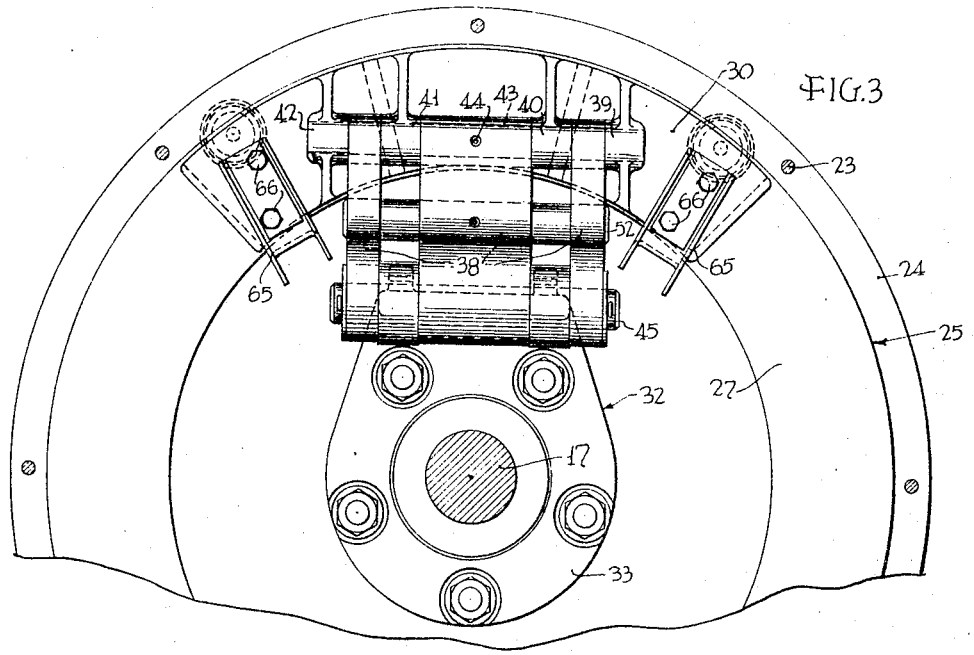
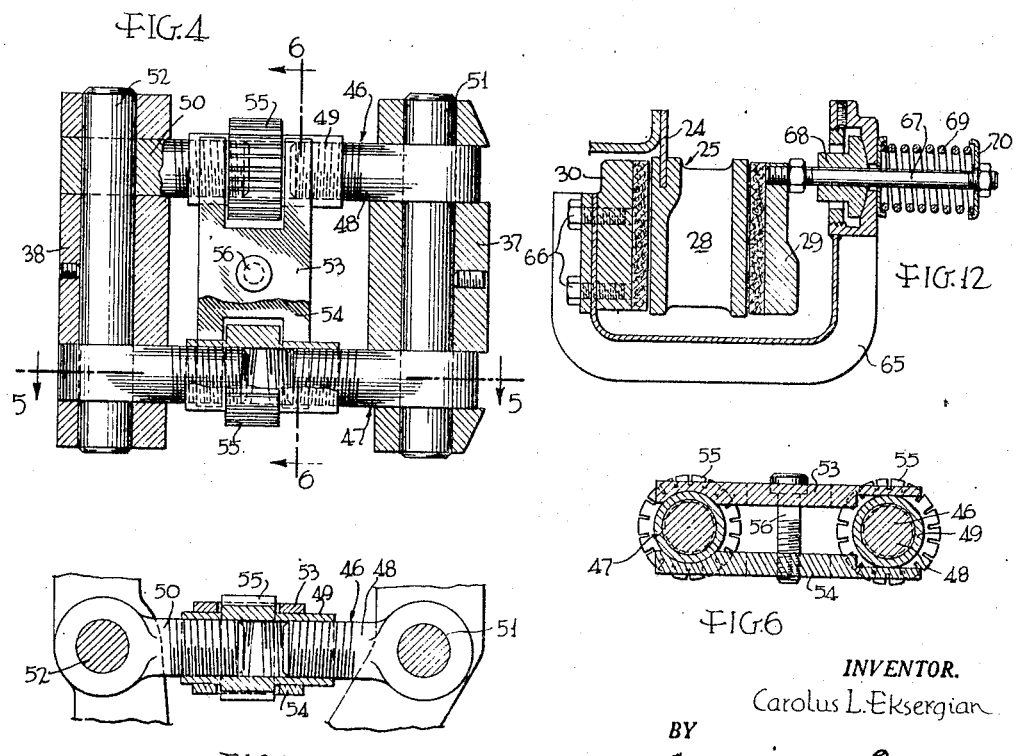
INVENTOR.
Carolus L. Eksergian
BY
Maurice A. Cround
ATTORNEY Patented Oct. 13, 1953

2,655,228

UNITED STATES PATENT OFFICE 2,655,228

SELF-ENERGIZING BRAKE

Carolus L. Eksergian, Media, Pa., assignor to The Budd Company, Philadelphia, Pa., a corporation of Pennsylvania Application September 2, 1950, Serial No. 182,934

9 Claims. (Cl. 188—72)

The invention relates to a brake mechanism and more particularly to a brake mechanism of the self-energizing type adapted for use in automotive vehicles.

It is among the objects of the invention to provide a brake mechanism of this type which is simple in construction, easy to manufacture and assemble, and one which is highly efficient in operation.

These objects are in large part achieved by a brake mechanism, having a brake rotor, with opposed annular braking faces, which are preferably radial braking faces, and shoes in cooperative relation with the opposed braking faces, and carried by a support, on which they have limited floating movement transversely of the plane of the braking faces, the shoes being segmental shoes pivotally carried by the support, so as to readily align their braking faces with the respective faces on the rotor, and being actuated into braking engagement by manually-operated means. After each manual operation, the shoes are self-energized by being, in the case of one at least, moved circumferentially by its engagement with the rotor, and in such movement being more firmly forced into braking engagement by suitable camming means.

The objects of the invention and the manner in which they are attained will become more apparent from the following detailed description when read in connection with the drawings forming a part thereof.

In the drawings:

Fig. 1 is an elevational view of the brake mechanism showing the inboard side thereof, parts being omitted or shown in section;

Fig. 3 is an elevational view of the outboard side of the brake mechanism, parts being broken away and parts shown in section, the section being taken substantially along the line 3—3 of Fig. 2;

Fig. 4 is a detail sectional view, taken substantially along the line 4—4 of Fig. 2;

Figure 2:
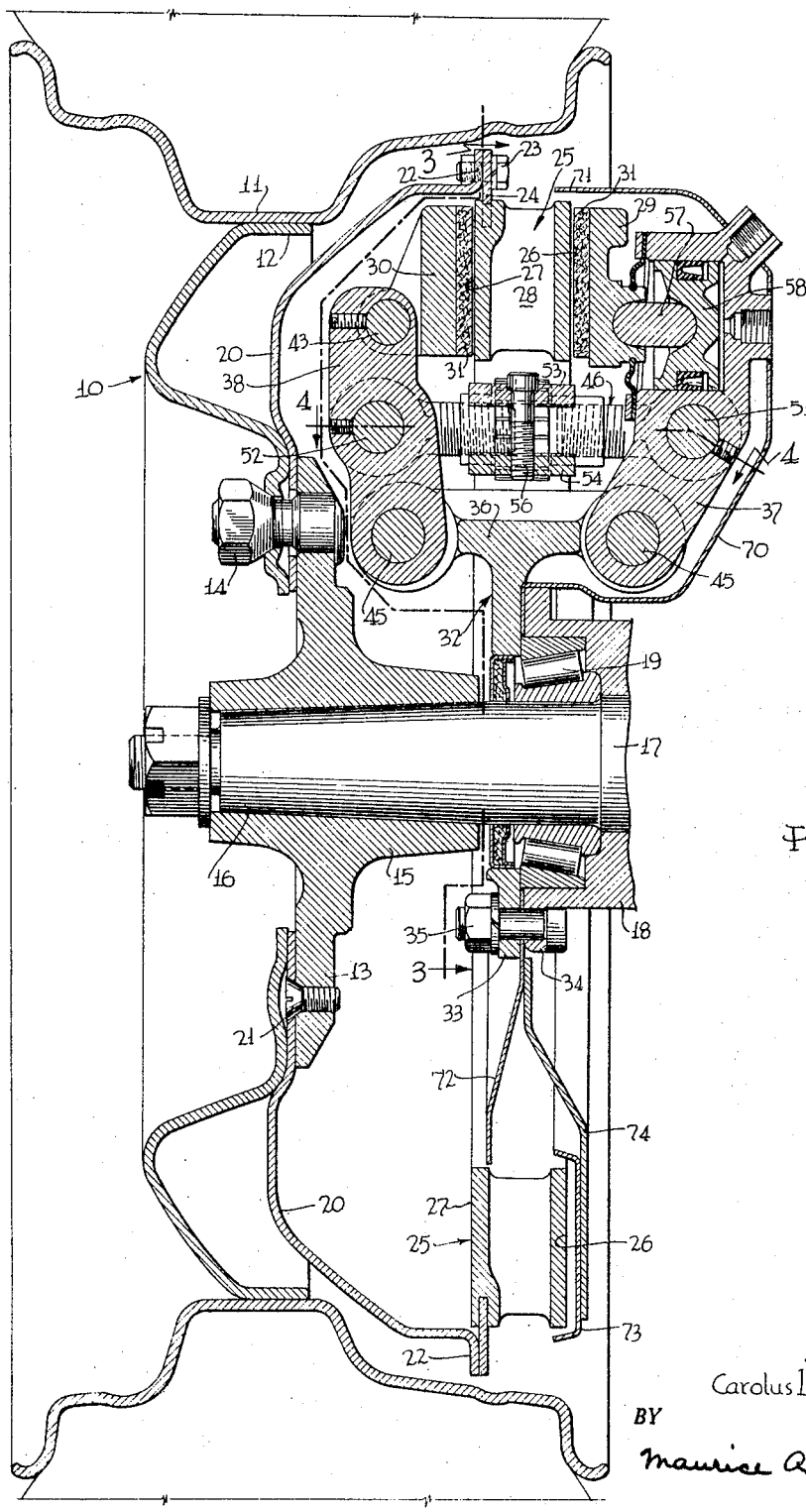
Fig. 2 is a cross-sectional view, through the brake mechanism and the wheel with which it is associated, the section being taken substantially along the line 2—2 of Fig. 1.

Figs. 5 and 6 are detail sectional views, taken substantially along the lines 5—5 and 6—6, respectively, of Fig. 4;

Fig. 7 is a fragmentary sectional view, on an enlarged scale, the section being taken substantially along the line 7—7 of Fig. 1;

Figs. 8, 9, 10, and 11 are detail views of a cam-carrying insert, Figs. 8 and 9 being, respectively, a side and an end elevation view, and Figs. 10 and 11 being sectional views taken, respectively, along the lines 10—10 and 11—11 of Fig. 9; and Fig. 12 is a detail sectional view taken substantially on the line 12—12 of Fig. 1.

In the drawings, the brake mechanism embodying the invention has been shown associated with the rear wheel of an automobile, but it will be understood that it is equally applicable to a front wheel or in other relations, if desired.

Referring now to Fig. 2, the wheel designated 10 is a usual form of disc wheel having a drop center rim 11 seated on and secured in a usual manner to the peripheral flange 12 of the wheel. The wheel is removably mounted on the hub flange 13 by an annular series of bolts, as 14. The hub-barrel 15 is non-rotatably secured in usual manner upon the tapered end 16 of the axle 17, and the latter is rotatably mounted in the axle housing 18 through the roller bearing, as 19.

The rotating element of the improved brake mechanism comprises a dished supporting plate 20 seated, in this embodiment, against the outer face of the hub flange 13 and held in place by screws, as 21, and the wheel securing bolts, as 14.

The outer periphery of the supporting plate 20 is flanged radially outwardly, at 22, and to this flange is secured, as by the bolts 23, the sheet metal annulus 24, which carries a usual form of blower ventilated brake ring 25 having opposed inboard and outboard radially-extending braking faces 26 and 27, and the brake cooling passages 28 therebetween.

The deep dish of the supporting plate 20 and the location of the brake ring 25 adjacent the rim leaves ample space radially inwardly between the brake ring and the axle housing for the disposition of the stationary brake mechanism associated with the rotating element.

This stationary mechanism comprises the segmental shoes 29 and 30, each carrying a suitable lining, as 31; the shoes being disposed at the top and in cooperative relation with the opposed braking faces 26 and 27 of the rotary brake ring 25.

The mounting of the shoes is such as to permit the application of an equalized pressure over the entire face of the lining and between it and the associated braking face, this equalized pressure being desirable to avoid heat checks of the brake ring.

According to the present embodiment of the invention, the inboard and outboard shoes 29 and 30 are carried by a support or spider 32 having a flat annular portion 33 bolted to a flange 34 on the end of the axle housing 18, as by bolts 35.

The shoes are carried by this spider 32, in this instance, by means forming with the radially outer portion 36 of the spider, a substantially U-form support, see Fig. 2, embracing the shoes. This U-form support comprises the outer portion 36 of the spider forming the bottom of the U and links 37 and 38 forming the sides of the U.

The outboard shoe 30 is pivoted through spaced lugs 39, 40, 41, and 42 to the triple section link 38, see Figs. 3 and 7, by the pin 43 locked in place against endwise shifting by the lock screw 44. This pin is arranged substantially in a plane dividing the braking face of the shoe lengthwise into equal parts, so that equalized pressure will be applied to said face.

The inner end of the triple section link 38 is pivoted through a pin 45 to the outboard end of the part 36 of the spider 32, see Fig. 2.

The inboard shoe 29 is carried from the inboard link 37, pivoted at 45 to the inboard end of the part 36 of the spider; and it is carried by this link so that it has freedom to pivot about an axis parallel to the plane dividing the shoe engaging face into two equal parts and also to move circumferentially to a slight extent for a purpose to be explained later on, as well as to have approach movement of the shoe toward the rotary brake element 25 for applying the brake.

To hold the shoes in normal position, in which they are spaced apart so as to avoid braking engagement with the rotary brake ring 25, the links 37 and 38 are connected intermediate their ends by a pair of adjustable links 46 and 47 clearly shown in the detail views 4, 5, and 6. Each of these links 46 or 47 comprises three parts 48, 49, 50. The end parts 48 and 50 are pivoted to the respective links 37 and 38 through the pins 51 and 52, and the intermediate sleeve part 49 has threaded engagement with the right and left screw threads on the parts 48 and 50.

From this it will be seen that the three part links are adjustable by rotating the intermediate sleeve portion 49. When the shoes have been adjusted to the proper distance apart, the sleeve portions 49 are locked in position by clamping plates 53 and 54 which have bifurcated ends to pass the central knurled portions 55 of the sleeves, these plates being clamped onto the sleeves by a clamping screw 56.

From time to time, as the brake lining wears, the clamp is released, and the links 46 and 47 are shortened slightly by turning the sleeves 49 an appropriate amount after which the clamping means is tightened to hold the links to this adjusted length.

The inboard brake shoe 29 is carried from the outer end of the inboard link 37 in the manner clearly shown in Fig. 7 and in the detail views 8-12, inclusive. Centrally of the shoe, it is engaged by a short link 57 having a rounded end at each end, one end engaging a similar rounded recess in the shoe, and the other, a similar recess in a piston 58 of the actuating cylinder 59 formed integrally in the link 37. Admission of pressure fluid through the usual manually controlled hydraulic system to the cylinder will force the shoes into engagement with the braking surfaces of the rotary brake member, and this will tend to drag the shoes around with it. The inboard shoe is mounted so it can move circumferentially or endwise to a limited extent in response to the friction between it and the rotor, and such movement of the shoe is availed of to press the shoes more forcibly into braking engagement, i. e. to obtain a servo-action.

To accomplish this, oppositely sloping cam faces 60 are provided in opposed recesses 61 in the link 37 and shoe 29, respectively, and a hardened ball 62 is seated in the opposed recesses. Two such opposed recesses, with interposed balls are preferably provided, and these are located in a plane normal to the shoe dividing it into two equal brake-engaging faces. This arrangement allows the shoe to pivot about the balls to follow the face of the rotary member. As shown in Fig. 7 and in the detail views 8-11, inclusive, the cams are formed in hardened inserts, as 63, which are press-fitted through their serrated margins 64 into corresponding recesses in the link and shoe, respectively, so that they are anchored non-rotatably therein. Preferably, the cam surfaces 60 have a bottom wall decreasing in depth from the center in opposite circumferential directions, this bottom surface conforming to the contour of the cooperating ball 62 so that the braking pressure is transmitted through an increased area, increasing the life of the cam inserts and balls.

To return the shoes to their normal position after braking, and hold them in spaced relation, as permitted by the adjustable links 46, 47, there are provided between the opposite ends of the shoes, a pair of members interconnecting the shoes, see Fig. 12. Since these are alike, only one need be described.

It comprises a U-shaped member 65 embracing the adjacent ends of the shoes, one arm of the U being rigidly secured, as by screws 66, to the back of the outboard shoe, and the other arm being yieldingly secured to the inboard shoe. Such yielding securement comprises a bolt 67 secured to the inboard shoe 29 and extending through a guide block 68 loosely secured in the inner arm of the U member 65. A spring 69 surrounds the end of the bolt projecting beyond the arm of the U and acts, through engagement with the arm and a cup 70 carried by the end of the bolt, to force the ends of the shoes apart. Thus, when the brakes are released by withdrawing the pressure fluid from the cylinder, the balls are automatically returned to the central position between the oppositely inclined cams 60, 60 by the springs 69, and the springs thereafter hold the parts firmly in this position while the brakes are in the off position.

Because of the oppositely inclined relation of the cams 60 and the normal central location of the balls cooperating therewith, it will be seen that the brake is operative for either direction of movement of the brake ring 25.

In Fig. 2, there is shown a shielding means for protecting the brake, at least to some extent, from being fouled by foreign matter. Such means may comprise, as shown, a sheet metal plate 70 which may be secured at the center between the flange 33 of the brake supporting spider 32 and the flange 34 on the axle housing. At the top, in the region of the shoes and the actuating means therefor, this plate shrouds this entire brake mechanism and terminates in its margin as 71, adjacent periphery of the inboard face of the braking ring 25. For the remainder of the circumference this plate is bent outwardly, as shown at 72, bottom of Fig. 2, and terminates adjacent the inner periphery of the inboard face of the brake ring 25. To protect the inboard braking face 26 of the ring 25 in regions other than the top, where the shoes are located, a sheet metal channel-shaped member 73 is provided, which may be supported at intervals by supporting strips 74, secured to it and to the plate portion 72, see Fig. 2.

With this arrangement of shrouding means, there is substantially no interference with the free flow of cooling air through the passages 20, of the brake ring 25, while substantial protection is had against fouling of the brake by foreign matter.

From the foregoing description, it is believed that the operation of the mechanism is made clear, and further description of the operation would be redundancy.

While a specific embodiment of the invention has been herein described in detail, it will be understood that changes and modifications may be made by those skilled in the art without departing from the spirit and scope of the invention as expressed in the appended claims.

What is claimed is:

1. In combination, a brake rotor having opposed braking faces, segmental shoes for cooperation with the respective faces, the shoes having their length arranged circumferentially, a support for the shoes including parts having substantially U-form embracing the shoes, one of said shoes being pivoted to one arm of the U and the other shoe being carried by the other arm of the U so as to have a first movement away from said arm, a second movement about an axis generally lengthwise of the shoe and a third movement in a circumferential direction with respect to said arm, manually controlled means for moving the shoe away from the arm to apply the brake, and means between said arm and shoe for causing a servo-action to increase the braking force when the frictional engagement of the shoe with the rotor tends to drag the shoe around with the rotor.

2. In combination, a brake rotor having a braking face, a segmental shoe for cooperation with said face, the shoe having its length arranged circumferentially, a support for the shoe including means for moving the shoe axially into braking engagement with the braking face under manual control, the shoe being mounted on the support for pivotal movement about an axis within its width parallel to a secant of the brake rotor, said shoe also having slight circumferential movement with respect to its support, and means interposed between the support and the shoe for causing a servo-action to increase the braking force in such circumferential movement of the shoe under the friction force caused by the manually controlled operating means.

3. In combination, a brake rotor having a braking face, a segmental shoe for cooperation with said face, the shoe having its length arranged circumferentially, a support for the shoe including a part opposed to the back of the shoe, an axially aligned cylinder carried by said part and a piston in said cylinder having floating connection with the shoe for moving it axially into braking engagement with the rotor, and means for spacing the shoe from said part including pairs of opposed recesses on said part and shoe disposed on a plane normal to the shoe and dividing the braking face of the shoe substantially equally lengthwise of the shoe, oppositely sloping cam faces in said recesses, and balls engaging the associated cam faces, whereby the shoe can tilt on said balls about an axis parallel to a secant of said rotor to follow the rotary braking face and, when the shoe is moved endwise relative to said support part by the braking friction produced upon actuation of the cylinder, the balls ride up the cams to apply additional braking force.

4. In combination, a brake rotor having a braking face, a segmental shoe for cooperation with said face, the shoe having its length arranged circumferentially, a support for the shoe including a part opposed to the back of the shoe, means carried by said part for moving the shoe axially into braking engagement under manual control and providing circumferential movement of the shoe relative to said support part, and cam means between the shoe and said part at spaced points along the length of the shoe for imparting a servo-action upon the shoe when it is moved endwise by the frictional engagement with the rotor incident to the manually-controlled actuating means, said cam means at each circumferential point comprising opposed cam faces on the shoe and part, and a ball engaging said faces, and riding up the slopes of the cam faces to effect said servo-action, the shoe having pivotal movement on said ball intermediate its width about an axis parallel to a secant of said rotor.

5. In combination, a brake rotor having opposed braking faces, segmental shoes for cooperation with the respective faces, the shoes having their length arranged circumferentially, support means for said shoes including U-form parts embracing the shoes, one shoe being pivoted on one arm of the U and the other on the other arm of the U, means for spacing said shoes apart a predetermined distance, and means associated with one of the arms of the U for forcing said shoes axially into braking engagement with the rotor faces under manual control, at least one of said shoes being mounted on its arm so as to be movable endwise by the frictional engagement with the rotor due to the manually-controlled means and also mounted for pivotal movement about an axis parallel to a secant of the rotor, and means operative upon such endwise movement to apply still greater braking force to the shoes.

6. In combination, a brake rotor having opposed braking faces, segmental shoes for cooperation with the respective faces, the shoes having their length arranged circumferentially, support means for said shoes including generally U-form parts embracing the shoes, means for normally spacing said shoes apart a predetermined distance, one shoe being pivoted to one of the arms of the U and the other to the other arm of the U, said last-named shoe having as its pivotal connection to the arm to provide circumferential movement of the shoe relative to the arm, ball and cam means located at spaced points lengthwise of the shoe, and the said last-named shoe being movable endwise on the initial application of the brakes to cause the balls to ride up the cams and thus increase the braking force, the shoe also having pivotal movement on the balls about an axis parallel to a secant of the rotor and yielding means connecting the ends of the shoes for returning them and the balls to their inoperative position.

7. In combination, a brake rotor having opposed radial braking faces, segmental shoes for cooperation with the respective faces, the shoes having their length arranged circumferentially, support means for said shoes including U-form parts embracing the backs of the shoes, the shoes being pivotally carried from the respective arms of the U and with the pivot axis in a plane normal to the braking face of the respective shoe and dividing said face into substantially equal parts, the plane also passing through a secant of the rotor, the pivotal connection for at least one of the shoes including longitudinally spaced pairs of opposed cams on the shoe and arm, respectively, with a cooperative ball interposed between the opposed cams and the shoe being free to move endwise to a limited extent, under manually applied braking, to cause the balls to ride up the associated cams to apply the brakes with increased force.

8. In combination, a brake rotor having opposed radial braking faces, segmental shoes for cooperation with the respective faces, the shoes having their length arranged circumferentially, support means for the shoes including a fixed horizontally extending portion and radially extending links pivoted to the outboard and inboard ends of said portion, the shoes being pivotally carried by the radially outer ends of said links with the pivot axis in a plane normal to the braking face of the respective shoe, adjustable links interconnecting said first-named links intermediate their ends, the pivotal connection for at least one of the shoes including longitudinally spaced pairs of opposed cams on the shoe and the associated link, respectively, with a cooperative ball interposed between the opposed cams, and the shoe being free to move endwise to a limited extent under manually applied braking force, to cause the balls to ride up the associated cams to apply the brakes with increased force, and means yieldingly interconnecting the end of the shoes for returning the shoe and associated balls to their initial position and holding them yieldingly in said position.

9. In combination, a brake rotor having a braking face, a segmental shoe for cooperation with said face, the shoe having its length arranged circumferentially, a support for the shoe including a part opposed to the back of the shoe, means carried by said part for moving the shoe axially into braking engagement under manual control and providing circumferential movement of the shoe relative to said support part, and cam means between the shoe and said part at spaced points along the length of the shoe for imparting a servo-action upon the shoe when it is moved endwise by the frictional engagement with the rotor incident to the manually-controlled actuating means, said cam means at each circumferential point comprising opposed cam faces on the shoe and part, and a ball engaging said faces, and riding up the slopes of the cam faces to effect said servo-action, the shoe having pivotal movement on said ball intermediate its width about an axis parallel to a secant of said rotor, said cam faces conforming transversely of their length to the contour of the ball.

CAROLUS L. EKSERGIAN.

References Cited in the file of this patent
UNITED STATES PATENTS

| Number | Name | Date |
|---|---|---|
| 1,827,065 | Brownyer | Oct. 15, 1931 |
| 2,239,236 | Lambert | Apr. 22, 1941 |
| 2,355,122 | Tack | Aug. 8, 1944 |
| 2,419,113 | Bricker | Apr. 15, 1947 |